Dec. 22, 1942. S. G. THOMSON 2,306,006
COMBINED LITTER LEG AND SADDLE
Filed Jan. 16, 1942 5 Sheets-Sheet 1
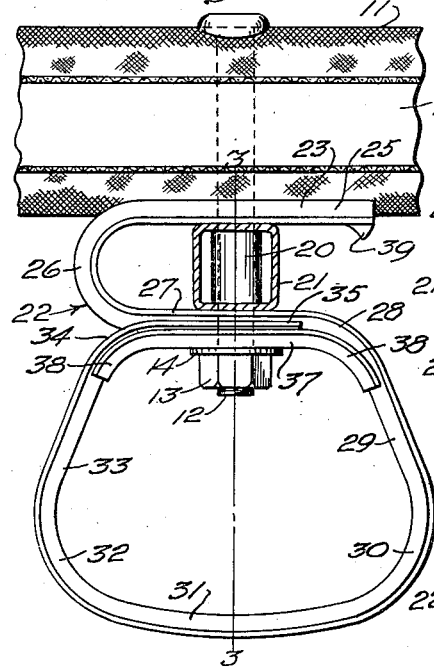
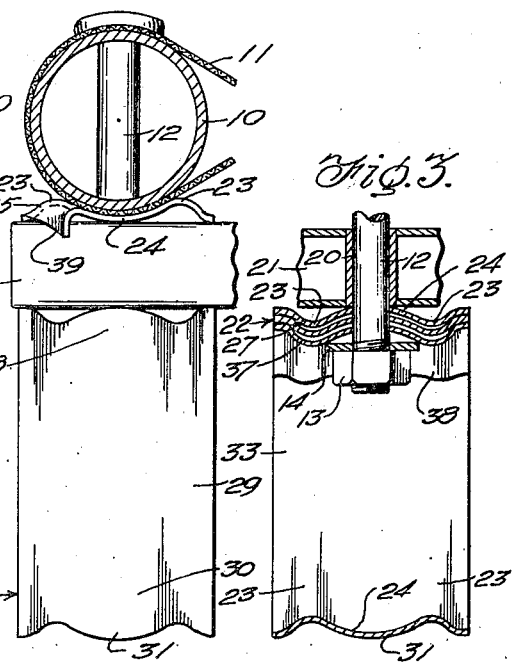
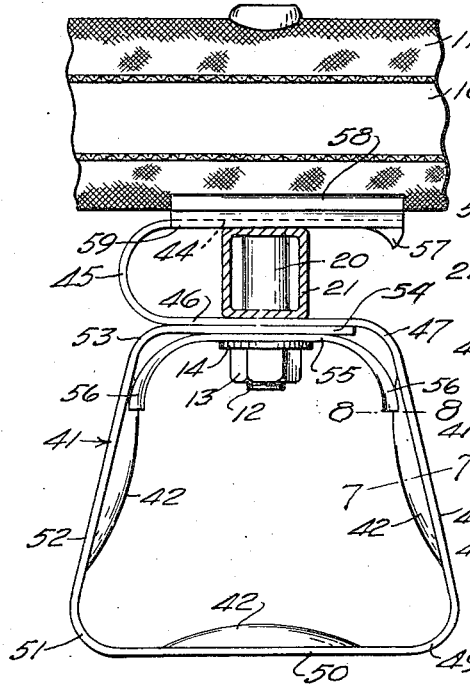
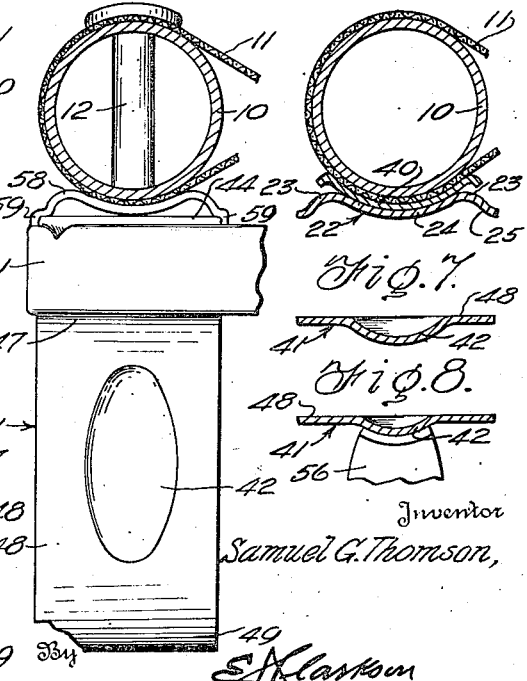
Inventor
Samuel G. Thomson,
By
E. A. Laskow
Attorney Dec. 22, 1942.    S. G. THOMSON    2,306,006
COMBINED LITTER LEG AND SADDLE
Filed Jan. 16, 1942    5 Sheets-Sheet 2
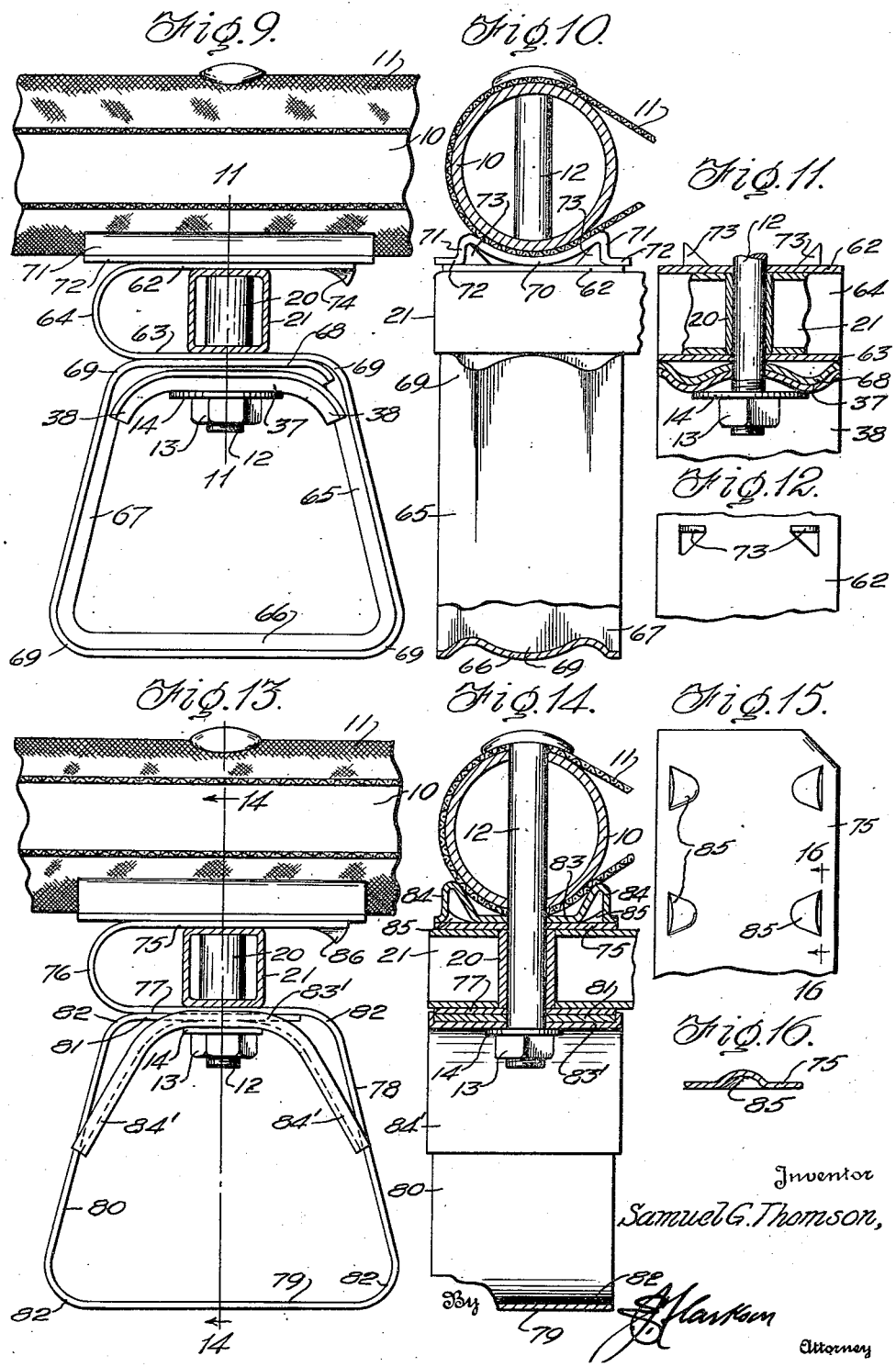

Dec. 22, 1942.  S. G. THOMSON  2,306,006
COMBINED LITTER LEG AND SADDLE
Filed Jan. 16, 1942  5 Sheets-Sheet 3
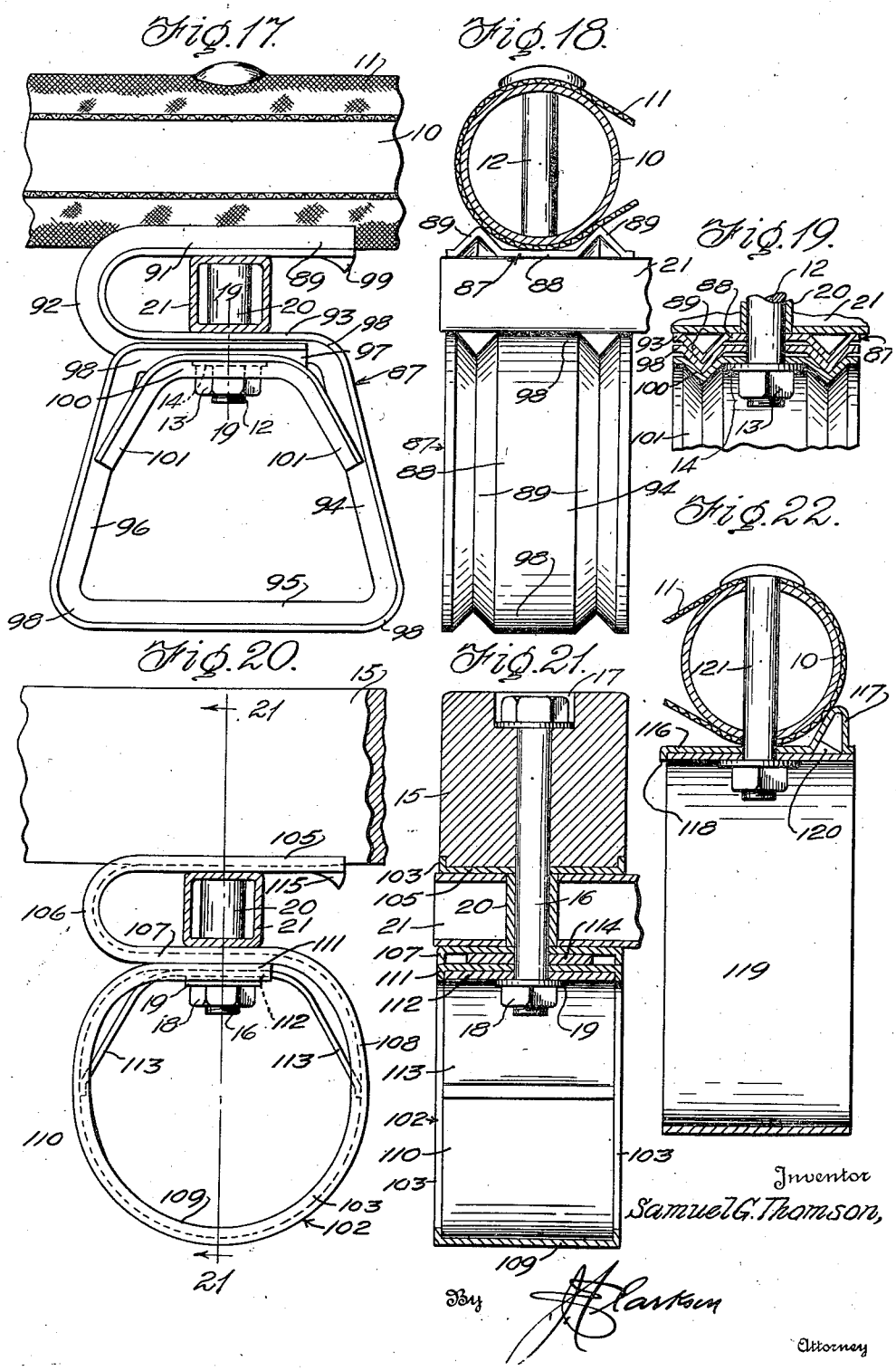

Dec. 22, 1942.   S. G. THOMSON   2,306,006
COMBINED LITTER LEG AND SADDLE
Filed Jan. 16, 1942   5 Sheets-Sheet 4
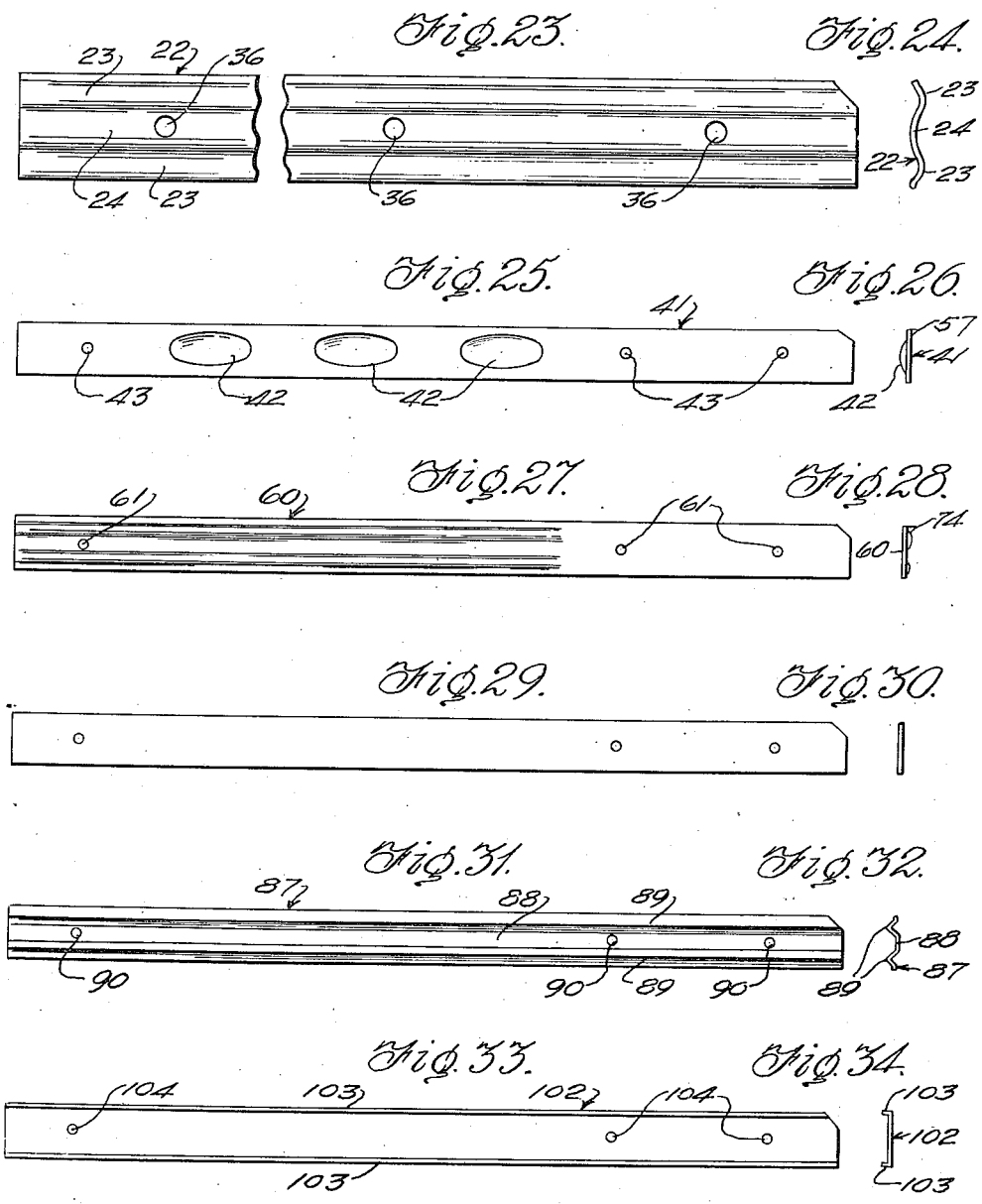
Inventor
Samuel G. Thomson,
By Clarkson
Attorney

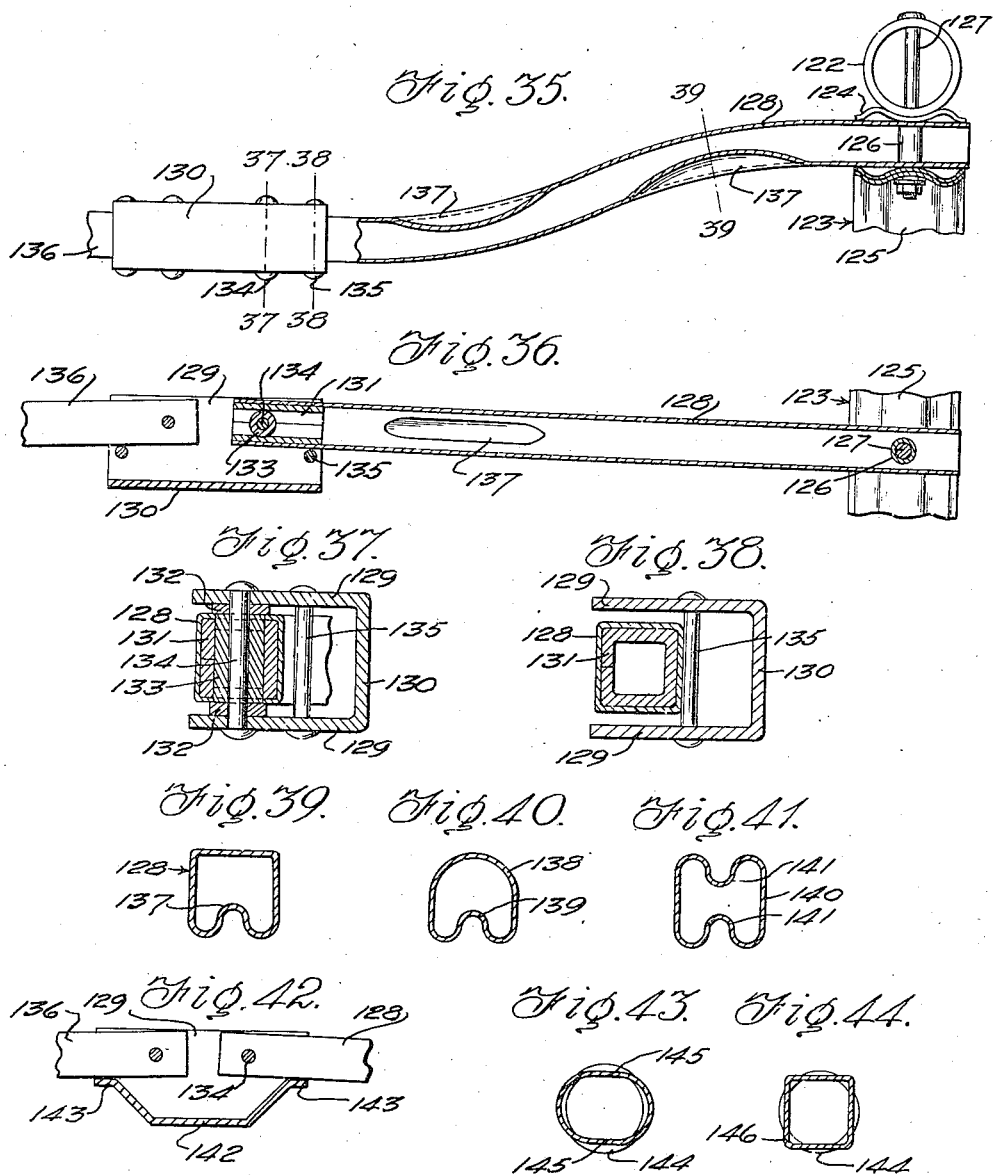

Patented Dec. 22, 1942

2,306,006

UNITED STATES PATENT OFFICE 2,306,006

COMBINED LITTER LEG AND SADDLE

Samuel G. Thomson, Flushing, N. Y.

Application January 16, 1942, Serial No. 427,078

16 Claims. (Cl. 5—82)

This invention relates to folding litters and especially to the legs and pole saddles used in such litters.

The invention also relates to the means for maintaining the poles of folding litters in fully spaced position, such means being usually termed stretcher-bars.

In the construction of litters of the present character it is desirable to construct the legs in such manner that they will be of very light construction while at the same time they are rigid and resistant to distortion. It is also desirable in such litter legs, for economy of manufacture, to construct the leg of strip material extruded, molded or pressed to cross-sectional conformation such as will give great rigidity to a leg formed from such strip material when bent to leg shape.

It is therefore one important object of the invention to provide a novel construction of litter legs wherein the leg is formed from a strip of bendable material of cross-sectional form such as will ensure great rigidity to the formed leg.

In litter constructions it is usual to connect the legs on one pole with the legs on the other by hinged stretcher-bars pivoted at their ends to the legs. In order to provide proper strength at the pivotal connections between the stretcher-bars and legs it is desirable that the legs be reinforced at the points of connection.

A second important object of the invention is to provide a form of leg made from strip material wherein the leg will have two thicknesses of strip at the pivot point, the arrangement being obtained by lapping one portion of the strip on the other.

A third important object of the invention is to provide a cross-sectional form of strip wherein lapping portions of such a strip will interlock against lateral movement.

In the formation of litter legs from thin strip material it is desirable to reinforce or support the sides of the leg against bending inwardly by blows occurring in handling the litter. Also, in litters of the present character it is usual to use a bolt for holding the leg to the pole, this bolt also forming the pivot for a stretcher-bar end.

A fourth important object of the invention is to provide a novel form of brace member for the sides of a litter leg, the brace member being secured in place by the same bolt which holds the leg to the pole.

A fifth object of the invention is to provide means whereby such as reinforcing member will cooperate with the cross-sectional form of the leg in such manner that shifting, either laterally or rotationally, of said member with respect to the leg will be prevented.

In order to provide for rapid and economical construction of litters it is desirable that the pole saddle used to provide proper connection between the litter pole and leg should be formed integrally with the leg and it is also desirable that the pole saddle is of such form as to resist lateral movement and twisting out of alignment with the pole.

A sixth important object of the invention is to provide a novel form of combined leg and pole saddle wherein the leg and saddle are formed from a single continuous strip of bendable material of such cross-sectional form as to provide an end portion adapted to fit a litter pole in such manner as to inhibit lateral and twisting movements of the saddle on the pole.

A seventh important object of the invention is to provide a novel form of stretcher bar formed from thin walled tubular material having reinforcements at its hinge or pivot portions.

An eighth important object of the invention is to provide a novel form of bent thin walled tubing suitable for litter stretcher-bars and the like.

With the above and other objects in view, the invention consists in general of certain novel details of construction and combinations of parts hereinafter fully described, illustrated in the accompanying drawings and particularly pointed out in the appended claims.

In the accompanying drawings like characters of reference indicate like parts of the several views, and:

Figure 1 is a side elevation of a portion of a litter showing one form of unitary leg and saddle construction in accordance with the present invention.

Figure 2 is an elevation looking at the parts shown in Figure 1 from the right side thereof.

Figure 3 is a detail section on the line 3—3 of Figure 1.

Figure 4 is a detail section taken transversely through a litter pole and showing the saddle of Figure 2 as used with a reinforcing plate for distributing the stresses from the saddle over the pole.

Figure 5 is a side elevation of a portion of a litter showing a construction wherein auxiliary saddle means are used in connection with a leg made from strip material and having a unitary saddle portion associated with the auxiliary saddle means.

Figure 6 is an elevation of the device shown in Figure 5 as seen from the right side thereof.

Figure 7 is a fragmentary section on the line 7—7 of Figure 5.

Figure 8 is a similar section on the line 8—8 of Figure 5.

Figure 9 is a view similar to Figure 5 but showing a modification thereof.

Figure 10 is an elevation partly in section of the device shown in Figure 9.

Figure 11 is a fragmentary section on the line 11—11 of Figure 9.

Figure 12 is a plan view of a portion of the saddle part of the strip material used in the form shown in Figure 9.

Figure 13 is a view similar to Figure 5 but showing a second modification thereof.

Figure 14 is a section on the line 14—14 of Figure 13.

Figure 15 is a view similar to Figure 12 but showing the modified form used in the device of Figure 13.

Figure 16 is a fragmentary section on the line 16—16 of Figure 15.

Figure 17 is a view similar to Figure 1 but showing a modification thereof.

Figure 18 is a view of this modification taken from the right side of Figure 17.

Figure 19 is a fragmentary section on the line 19—19 of Figure 17.

Figure 20 is a view similar to Figure 1 but showing a second modification thereof.

Figure 21 is a section on the line 21—21 of Figure 20.

Figure 22 is a section taken transversely of a litter pole, saddle and leg and showing a still further modification of the form having an auxiliary saddle member.

Figure 23 is a broken plan view of the strip used in forming the structure of Figure 1.

Figure 24 is an end view of Figure 23.

Figure 25 is a plan view of the strip used in forming the structure of Figure 5.

Figure 26 is an end view of Figure 25.

Figure 27 is a plan view of the strip used in forming the structure of Figure 9.

Figure 28 is an end view of Figure 27.

Figure 29 is a plan view of the strip used in forming the structure of Figure 13.

Figure 30 is an end view of Figure 29.

Figure 31 is a plan view of the strip used in forming the structure of Figure 17.

Figure 32 is an end view of Figure 31.

Figure 33 is a plan view of the strip used in forming the structure of Figure 20.

Figure 34 is an end view of Figure 33.

Figure 35 is a view partly in elevation and partly in section and showing a stretcher assembly arrangement as constructed in accordance with this invention.

Figure 36 is a plan view partly in section and showing parts disclosed in Figure 35.

Figure 37 is an enlarged section on the line 37—37 of Figure 35.

Figure 38 is an enlarged section on the line 38—38 of Figure 35.

Figure 39 is an enlarged section on the line 39—39 of Figure 35.

Figure 40 is a section similar to Figure 39 but showing a modified tube cross-section.

Figure 41 is a section similar to Figure 39 but showing a second modification.

Figure 42 is a fragmentary section disclosing a modification of the joint shown at the left side of Figure 36.

Figure 43 is a cross-section showing one form of flat end on a circular thin walled tube for use in connection with the present stretcher assembly.

Figure 44 is a view of a modification of the end shown in Figure 43.

In the several forms of the invention as shown in Figures 1 to 19 inclusive there is disclosed a portion 10 of a tubular litter pole carrying the stretcher fabric 11. Through the litter pole extends a bolt 12 which projects well below the pole and carries on its lower end a nut 13 and washer 14. In the form shown in Figures 20 and 21 a square pole 15 has a bolt 16 extending therethrough, the head of the bolt being held in a recess 17 and the bolt being provided at its lower end with a nut 18 and washer 19.

On each of the bolts shown in Figures 1 to 21 a spacer sleeve 20 is mounted on the bolt between the pole and washer and on the sleeve is pivoted one end of a stretcher bar 21.

In the form of the invention shown in Figures 1, 2, 3 and 4 the integral leg and saddle are formed from a single continuous length of bendable strip material 22 such as is shown in Figures 23 and 24. This strip is made from any desired material and is produced by rolling, extruding, molding, die pressing or in any other manner suitable for producing the required cross section and the other strips hereafter described are of like character of material and are similarly produced. The strip 22 is sinuously corrugated throughout its length to form a pair of rounded ribs 23 adjacent the side edges of the strip and a rounded channel portion 24 extending longitudinally of the center of the strip this channel being of proper curvature and depth to accommodate a portion of the pole 10 and fabric 11. This strip has a straight end portion 25 forming a saddle engaging the fabric and pole and the saddle portion 25 merges into a downwardly extending semi-circular bend 26 which merges into a straight leg top portion 27 parallel to and spaced below the saddle portion 25. The portion 27 merges into a downwardly curved portion 28 which in turn merges into a straight downwardly extending and outwardly inclined leg side 29. The lower end of the leg side merges by a curved portion 30 into one end of a ground engaging portion 31 from the other end of which extends a curved portion 32 which merges into a second leg side 33 extending upwardly and inwardly from the portion 22. From the upper end of the leg side 33 extends a curved portion 34 which merges into a terminal straight leg top portion 35 which underlies the portion 27 in contact therewith, the portions 27 and 35 thus being lapping portions. By reason of the corrugations of these lapping portions they so interlock that they will neither move laterally with respect to each other nor will one swing on the other. The portions 25, 27 and 35 are each provided with a bolt receiving opening 36 (Fig. 23) which, in the completed device are vertically aligned and receive the bolt 12. The sleeve 20 extends between the portions 25 and 27 and holds these portions apart. The bar 21 is of slightly less height than the space maintained by the sleeve 20 between the portions 25 and 27 so that the bar may swing readily without excessive friction. In connection with this form of the invention there is provided a leg brace formed from a strip corrugated and fabricated in the same manner as the strip 22. This brace strip has a straight central portion 37 which fits against the under side of the leg portion 35 and interlocks therewith. The ends 38 of the brace strip curve downwardly and engage the inner faces of the leg sides 29 and 33 and reinforce and brace the legs from bending inwardly. The portions 38 also interlock with the leg sides and may engage said sides at any point and extend therealong for any distance experience may show to be desirable. The bolt 12 passes through the center of the brace and when the nut 13 is screwed up the parts 27, 35 and 37 are clamped firmly together and the leg and saddle securely attached to the pole. One corner of the strip portion 25 is turned down to form a stop 39 and thus limit pivotal movement of the bar 21.

The fragmentary section shown in Figure 4 illustrates the manner in which a channel shaped washer plate 40 may be interposed between the saddle part 25 and pole. This plate 40 may be made of rigid material and of such size as to distribute the stress on the tubular pole over a greater area than that afforded by the saddle if the latter is seated directly on the pole or fabric covering the latter.

In the form of the invention shown in Figures 5 to 8 the device has the leg and saddle portions formed from a strip of bendable material 41 such as is shown in Figures 24 and 25, it being noted that this strip is flat except for the provision of spaced oval bosses 42 formed by suitably displacing portions of the strip material out of the plane of the remainder thereof. This strip is also provided with holes 43 for the bolt 12. As in the first form one end of the strip is flat and forms a saddle portion 44. A curved portion 45 unites the saddle 44 with an upper leg top portion 46 which is in turn connected by a curved portion 47 with a leg side 48. The lower end of the side 48 is joined by a curve 49 with a ground engaging portion or foot 50. The foot 50 joins by a curved portion 51 with the remaining leg side 52 which is united at its upper end by a curved portion 53 with a straight lower top portion 54 which underlies the portion 46 in contact therewith so that the top of the leg is of double thickness as in the first form. In this form the brace member has a flat central portion 55 which fits on the bolt 10 in contact with the portion 54. The ends 56 of the brace are curved downwardly and also transversely to engage the upper portions of the bosses 42 which extend inwardly from the leg sides. The remaining boss 42 extends upwardly from the foot 50. One corner of the portion 44 is turned down to form a stop 57 as before. In this form, instead of the washer plate 40, there is provided a washer or upper saddle plate 58 of the same general cross section as the strip 22 but this plate has its side edge downwardly flanged as at 59 to embrace the lower saddle plate 44 and thus prevent lateral and rotational shifting of one on the other. In the form of the invention shown in Figures 9 to 12 the strip 60 from which the device is made can be best seen from Figures 27 and 28 to have about one-third of its length in the form of a plain flat strip while the remaining two-thirds is corrugated in the same manner as the strip 22. This strip is likewise provided with holes 61 for the bolt 12. The strip when bent has the end of the plain portion flat to form a saddle portion 62 joined to the upper leg top portion 63 by a curved portion 64. These parts are all formed from the plain end. The corrugated portion forms a continuation of this plain portion and is bent in such manner as to provide a leg side 65, a ground engaging portion or foot 66, a second leg portion 67 and a lower leg top portion 68, the latter lapping and engaging the upper leg top 63. The parts just described merge into each other through curved portions 69. The brace member 37 with its downturned ends 38 is used also in this form. In this form the washer plate or upper saddle portion has a central arcuate channel portion 70 having its edges bent downward as at 71 and provided with outwardly extending flanges 72, and the saddle portion is provided with upwardly struck lugs 73 which engage against the inner sides of the edges 71. The parts are assembled as in the previous forms. The usual stop corner 74 is also provided.

In the form shown in Figures 13 to 16 the strip, as shown in Figures 29 and 30 is a plain flat strip throughout. One end of this strip is flat and forms a saddle portion 75 connected by a curve 76 to an upper leg top 77. From the leg top 77 the strip extends to form a leg side 78, a ground engaging portion or foot 79, a second leg 80 and a lower leg top 81 which contacts the under side of the portion 77. These portions merge into each other by curves 82. The washer plate or upper saddle portion has a channel shaped central portion 83, the sides of which flare outwardly and are provided with downwardly extending flanges 84. Lugs 85 are struck up from the saddle portion 75 and engage against the inner faces of the flanges 84 and a stop 86 is provided at one corner of the portion 75.

In this form the brace member consists of a shallow channel shaped member having a flat central portion 83' and flaring ends 84', the leg sides 78 and 80 and the leg top 77, 81 being held between the flanges of the brace member.

In the form of the invention shown in Figures 17 to 19 the strip 87 as shown in Figures 31 and 32, has a flat central portion 88 and a pair of V-shaped ribs 89 on opposite sides of the flat portion, these ribs and flat portion being so proportioned and spaced as to permit proper seating of the pole. The strip is provided with the usual holes 90. When bent the strip forms a straight saddle portion 91 having at one end a curved portion 92 by which it is connected to an upper leg top 93. The strip continues from the top 93 to form a leg side 94, a ground engaging portion or foot 95, a second leg side 96, and a lower leg top 97, these parts merging into each other through curved portions 98. The part 91 has the usual bent corner forming a stop 99. The brace strip in this form has the same cross-sectional shape as the strip 87 and is formed with a central flat portion 100 having downwardly extending and flaring ends 101. As in the other forms, the bolt 12 and nut 13 secure the parts 93, 97 and 100 firmly together in interlocking relation.

In the form of the invention shown in Figures 20 and 33 the strip 102 is provided on each longitudinal edge with a flange 103 so that the strip forms a shallow channel. The strip also has the bolt holes 104. This strip when bent has one end portion 105 straight to form a saddle, the pole 15 being rabbetted to insure proper fit. This saddle is connected by a curved portion 106 to an upper leg top 107. From the other end of the portion the strip extends in a continuous curve providing a leg side 108, leg foot 109 and second leg side 110 which merges into a lower top portion 111 engaging the under side of the portion 107. The brace member is formed of a flat strip having a central portion 112 and diverging ends 113, the width of the strip being such as to fit snugly between the flanges 103. A washer 114 is fitted between the portions 107 and 111 to prevent bending of these parts under stress exerted by screwing up of the nut 18. The usual corner stop 115 is provided in this form.

In Figure 22 the usual tubular pole 10 and fabric 11 are shown in connection with a modification of the washer or upper saddle member wherein a flat plate 116 having one side formed with a rib 117 like the rib 84 of Figure 14 while the other edge has a flange 118 to grip the edge of the leg 119. A lug 120, struck upwardly from the top of the leg, engages in the groove of the rib 117 to brace the leg. The parts are held together by a bolt and nut 121.

Figures 35 to 39 illustrate a stretcher assembly for foldably securing the poles of a litter together, one pole only being shown. The pole 122 is provided with legs one of which is indicated in general at 123 to provide a saddle portion 124 and a leg portion proper 125 which is spaced below the saddle by a tubular sleeve 126. A bolt 127 holds these parts together and extends through the sleeve. Pivoted on the sleeve is one end of a stretcher bar 128, the bar as here shown being a thin walled square tube reversely curved to arch downwardly as shown in Figure 35. The other end of the bar 128 engages between the flanges 129 of a channel-shaped hinge member 130. In this end of the bar 128 is fitted a reinforcing sleeve 131. Washers 132 are positioned between the flanges 129 and the bar 128 and a tubular spacer 133 extends through the bar 128 and sleeve 131 to space its washers in order to prevent gripping of the bar 128 between them. A pin 134 passes through the spacer, the washers and the flanges 129 to hold the parts together. There is also provided a stop pin 135 for limiting swinging motion of the bar 128 on the pivot formed by the sleeve 133. The bar 128 is secured in one end of the hinge and a similar bar 136 extends from the other end of the hinge 130 to the opposite pole. A structure corresponding in general to this is shown in Figure 1 of my copending application, filed May 9, 1941, and bearing the Serial Number 392,766.

It will be noted that the member 128 is a thin walled tube. To bend such tubes without so distorting them that they are weakened at the bends has been deemed impractical under ordinary shop conditions but it has been found that if portions of the tubes are inset as at 137 the tube will bend as desired and the bend will be strengthened rather than weakened.

In Figure 40 a circular tube 138 is shown as inset at 139 in this manner and in Figure 41 is shown a square tube 140 inset on opposite sides as at 141.

In Figure 42 a modification of the hinge is shown wherein the web 142 is formed to provide stop portions 143 which replace the pins 135.

A circular tube 144 may be used for the stretcher-bar and in this case the ends of the tube may be flattened on opposite sides as at 145 in Figure 43 or swaged to form a square as at 146 in Figure 44.

What is claimed as new, is:

1. A litter leg formed from a single continuous strip of bendable material, said strip being formed to provide a ground engaging portion, a pair of side portions having curved lower ends merging into the ends of the ground engaging portion, said leg further having the upper ends of the side portions curved toward each other, and top portions extending in lapping and contacting relation from said upper curved portions.

2. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, and top portions extending in lapping and contacting relation from said upper curved portions, in combination with a litter pole, and a single bolt passing through said lapping portions of the leg and securing the leg to the pole.

3. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, top portions extending in lapping and contacting relation from said upper curved portions, in combination with a litter pole, and a single bolt passing through said lapping portions of the leg and securing the leg to the pole, and an arched strip having its central portion secured by said bolt and having its ends engaging the inner sides of the side portions of the leg.

4. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, and top portions extending in lapping and contacting relation from said upper curved portions, the upper of said lapping portions being upwardly recurved and forming an end portion spaced above and parallel to said upper lapping portion, and a bolt passing through the lapping portions and the end portion parallel thereto and adapted to secure the leg to a litter pole.

5. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, top portions extending in lapping and contacting relation from said upper curved portions, the upper of said lapping portions being upwardly recurved and forming an end portion spaced above and parallel to said upper lapping portion, a bolt passing through the lapping portions and the end portion parallel thereto and adapted to secure the leg to a litter pole, and an arched strip having its central portion secured by said bolt and having its ends engaging the inner sides of the side portions of the leg.

6. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, and top portions extending in lapping and contacting relation from said upper curved portions, said strip being provided with longitudinal corrugations with the corrugations of the lapping portions interlocking.

7. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, top portions extending in lapping and contacting relation from said upper curved portions, the upper of said lapping portions being upwardly recurved and forming an end portion spaced above and parallel to said upper lapping portion, and a bolt passing through the lapping portions and the end portion parallel thereto and adapted to secure the leg to a litter pole, said strip being provided with longitudinal corrugations with the corrugations of the lapping portions interlocking.

8. A litter leg formed from a single continuous strip of bendable material, said strip being formed to provide a ground engaging portion, a pair of side portions having curved lower ends merging into the ends of the ground engaging portions, said leg further having the upper ends of the side portions curved toward each other, top portions extending in lapping and contacting relation from said upper curved portions, in combination with a litter pole, and a single bolt passing through said lapping portions of the leg and securing the leg to the pole, and an arched strip having its central portion secured by said bolt and having its ends engaging the inner sides of the side portions of the leg, said arched strip and side portions of the leg being interlockingly formed.

9. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, and a tubular spacer surrounding said bolt between the saddle and first top portion.

10. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, a tubular spacer surrounding said bolt between the saddle and first top portion, and an arched strip having its central portion secured by said bolt and having its ends engaging the inner sides of the side portions of the leg.

11. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, a tubular spacer surrounding said bolt between the saddle and first top portion, and an arched strip having its central portion secured by said bolt and having its ends engaging the inner sides of the side portions of the leg, said arched strip and the side portions of said leg having coacting interlocking portions.

12. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, a tubular spacer surrounding said bolt between the saddle and first top portion, and an arched strip having its central portion secured by said bolt and having its ends engaging the inner sides of the side portions of the leg, said top portions being interlockingly formed.

13. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, a tubular spacer surrounding said bolt between the saddle and first top portion, and an arched strip having its central portion secured by said bolt and having its ends engaging the inner sides of the side portions of the leg, said top portions being interlockingly formed, and the ends of the arched strip and the side portions of the leg having coacting interlocking portions.

14. In combination, a pair of litter poles, a pair of stretcher assemblies connecting said poles, each of said assemblies including a pair of stretcher bars of thin tubular material having adjacent ends, a hinge element whereto said adjacent ends are pivoted, pivots connecting the remaining ends of said bars and the poles, and reinforcing sleeves each fitted in an end of a stretcher bar, each of said bars being curved and having an inwardly struck portion forming a groove on the concave side of the curve.

15. In combination, a pair of litter poles, a pair of stretcher assemblies connecting said poles, each of said assemblies including a pair of stretcher bars of thin tubular material having adjacent ends, a hinge element whereto said adjacent ends are pivoted, pivots connecting the remaining ends of said bars and the poles, and reinforcing sleeves each fitted in an end of a stretcher bar, each of said bars being reversely curved and having inwardly struck portions forming grooves on the concave sides of the curves.

16. The combination with a litter pole, of a litter leg and saddle formed from a single continuous strip of material, one end of said strip engaging along said pole to form a saddle and interlocking therewith, said strip extending downwardly and backwardly to provide a leg top portion parallel and spaced below the said end, said strip extending downwardly from the top portion and forming one leg side portion, said strip extending from the lower end of said leg side portion and upwardly to form a second leg side portion, said strip having an end portion extending from the top of said second side portion and underlying said top portion in contact therewith, a bolt passing through said top portions, saddle and pole and securing these parts together, a tubular spacer surrounding said bolt between the saddle and first top portion, and a plate interposed between said saddle and pole.

SAMUEL G. THOMSON.